United States Patent
Cho

(10) Patent No.: US 11,858,443 B2
(45) Date of Patent: Jan. 2, 2024

(54) METHOD OF DETECTING NORMALITY OF PWM SIGNAL OF AIRBAG CONTROLLER

(71) Applicant: HYUNDAI MOBIS CO., LTD., Seoul (KR)

(72) Inventor: Chung Hoon Cho, Gyeonggi-do (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/811,014

(22) Filed: Jul. 6, 2022

(65) Prior Publication Data
US 2023/0080078 A1    Mar. 16, 2023

(30) Foreign Application Priority Data
Sep. 14, 2021 (KR) .................. 10-2021-0122625

(51) Int. Cl.
*B60R 21/017* (2006.01)
*B60R 21/01* (2006.01)

(52) U.S. Cl.
CPC . *B60R 21/0173* (2013.01); *B60R 2021/01115* (2013.01); *B60R 2021/01184* (2013.01)

(58) Field of Classification Search
CPC ....... B60R 21/0173; B60R 2021/01115; B60R 2021/01184
See application file for complete search history.

(56) References Cited

U.S. PATENT DOCUMENTS 6,185,252 B1 * 2/2001 Bauer ............... H04L 25/4902
329/312

FOREIGN PATENT DOCUMENTS

KR    2016-0027836    3/2016

OTHER PUBLICATIONS

English Language Abstract of KR 2016-0027836 published Mar. 10, 2016.

* cited by examiner

*Primary Examiner* — Brian P Sweeney
(74) *Attorney, Agent, or Firm* — DLA PIPER LLP (US)

(57) ABSTRACT

A method of detecting normality of a PWM signal, wherein an error in a pulse-width modulation (PWM) signal is detected using four different self-test logics, and information obtained by categorizing results of detection into failure modes is transmitted to a vehicle component controller, so that the consistency of the PWM signal is determined, a signal safety means is secured, and further, safety standard requirements of the automobile field are satisfied.

13 Claims, 10 Drawing Sheets

METHOD OF DETECTING NORMALITY OF PWM SIGNAL OF AIRBAG CONTROLLER

CROSS REFERENCE TO RELATED APPLICATION

The present application claims priority to Korean Patent Application No. 10-2021-0122625, filed Sep. 14, 2021, the entire contents of which is incorporated herein for all purposes by this reference.

BACKGROUND OF THE DISCLOSURE

Field of the Disclosure

The present disclosure relates to a method of detecting normality of a PWM signal, wherein an error in a pulse-width modulation (PWM) signal is detected using four different self-test logics, and information obtained by categorizing results of detection into failure modes is transmitted to a different component controller of a vehicle, so that the consistency of the PWM signal is determined, a signal safety means is secured, and further, safety standard requirements of the automobile field are satisfied.

Description of the Related Art

As a key issue and requirement in current and future automobile development, a safety-critical system has been introduced. In particular, as the importance of electrical, electronic systems, and software increases, the risk of accidents due to mechanical failure as well as software defects and errors in interaction between system components has increased.

In order to prevent fatal accidents, in safety-critical industrial fields such as automobiles, aviation, etc., functional safety standards tailored to the characteristics of each industrial field were established based on the International Electrotechnical Commission (IEC) 61508 that is a meta model of functional safety. The IEC 61508 was modified into the International Standards Organization (ISO) 26262 that is a functional safety standard suitable for an automotive electrical/electronic system.

The ISO 26262 defines the safety requirements that designers and system engineers must realize even in a failure situation according to the level of international safety standard requirements in the automobile field, Automotive Safety Integrity Level (ASIL). Safety analysis examines the consequences of failure and defects, considering functions, operation states, and design. In addition, the safety analysis provides information on situations and causes that may lead to violation of safety goals or safety requirements, and informs about new risks not discovered during hazard analysis and risk assessment.

Herein, failure mode and effects analysis (FMEA) is common as a method of estimating failure frequency. According to this, three items, namely, severity, occurrence, and detection, are digitized, and a value obtained by multiplying the three items is expressed as RPN. In the current automobile industry field, as a way to reduce an RPN value, in transmission/reception of communication signals between in-vehicle control modules, it is intended to secure a safety mechanism (SM) for ensuring the consistency of the detection item.

In the meantime, the more luxury a vehicle, the larger number of in-vehicle electronic control devices and multimedia devices. In order to interconnect these separated systems, it is common to use controller area network (CAN) communication. In particular, an airbag control device has a C/O (crash output) function of transmitting a particular signal to a vehicle module internally connected thereto for additional use of collision detection information, and as a method of generating the signal, a pulse-width modulation (PWM) method is used together with CAN communication.

Currently, in the case of a C/O signal according to CAN communication, it is possible to determine the consistency of the signal by applying an alive counter and cyclic redundancy check (CRC), but in the case of a C/O signal according to the PWM method, there is no appropriate technique for a method of determining consistency.

The foregoing is intended merely to aid in the understanding of the background of the present disclosure, and is not intended to mean that the present disclosure falls within the purview of the related art that is already known to those skilled in the art.

SUMMARY

The present disclosure is directed to providing a method of detecting normality of a PWM signal, wherein an error in a pulse-width modulation (PWM) signal is detected using four different self-test logics, and information obtained by categorizing results of detection into failure modes is transmitted to a different component controller of a vehicle, so that the consistency of the PWM signal is determined, a signal safety means is secured, and further, safety standard requirements of the automobile field are satisfied.

According to the present disclosure, there is provided a method of detecting whether a PWM signal transmitted from an airbag controller to a vehicle component controller is normal, the method including: counting high values and low values of the PWM signal; integrating the high values and the low values of the PWM signal; comparing count results of the high values and the low values to first comparison values, and comparing integration results of the high values and the low values to second comparison values; and detecting whether the PWM signal is normal by separately deriving diagnosis results according to comparison with the count results and diagnosis results according to comparison with the integration results.

In the step of counting, the number of the high values and the number of the low values may be separately detected during a particular period of the PWM signal.

In the step of integrating, a high value area and a low value area belonging to a particular period of the PWM signal may be separately integrated.

In the step of integrating, a high value area and a low value area belonging to a total period of the PWM signal may be separately integrated, and the total period of the PWM signal may be predetermined and may be a sum of particular periods of the PWM signal.

In the method of detecting normality of the PWM signal according to the present disclosure, the first comparison values may be provided in advance as contrast values respectively corresponding to the high values and the low values, and in the step of comparing, the count result of the high values and the count result of the low values may be compared to the first comparison values.

In the method of detecting normality of the PWM signal according to the present disclosure, the second comparison values may be provided in advance as contrast values respectively corresponding to the high values and the low values, and in the step of comparing, the integration result of the high values and the integration result of the low values may be compared to the second comparison values.

In the method of detecting normality of the PWM signal according to the present disclosure, one of the second comparison values may be an integral value of the PWM signal as a whole corresponding to a particular period, and in the step of comparing, an integral value of the high values and an integral value of the low values may be added and an addition result may be compared to the one of the second comparison values.

In the method of detecting normality of the PWM signal according to the present disclosure, one of the second comparison values may be an integral value of the PWM signal as a whole corresponding to a total period, and in the step of comparing, an integral value of the high values and an integral value of the low values during the total period may be added and an addition result may be compared to the one of the second comparison values.

In the step of detecting, the separately derived diagnosis results may be individually counted, and when each count value is equal to or greater than a preset count value, it may be determined whether a signal transmission system has failed.

In the method of detecting normality of the PWM signal according to the present disclosure, depending on a result of the step of detecting, an in-vehicle warning light may be turned on.

The airbag controller may be provided with a PWM signal generator configured to generate the preset PWM signal as a vehicle is started.

The airbag controller may be provided with a PWM signal generator configured to generate the preset PWM signal as a vehicle is started, and when a collision occurs to the vehicle, the PWM signal generator may be configured to change the preset PWM signal to generate values different from those before the occurrence of the collision to the vehicle.

According to the present disclosure, the method of detecting normality of the PWM signal may further include transmitting the diagnosis results from the airbag controller to the vehicle component controller.

According to the present disclosure, the method of detecting normality of the PWM signal may further include: comparing the diagnosis results to a consistency determination result of communication for the vehicle, and finally determining whether safety requirements of the vehicle are satisfied; and transmitting a determination result from the airbag controller to the vehicle component controller.

According to the method of detecting normality of the PWM signal according to the present disclosure, an error in a pulse-width modulation (PWM) signal is detected using four different self-test logics, and information obtained by categorizing results of detection into failure modes is transmitted to a different component controller of a vehicle, so that the consistency of the PWM signal is determined, a signal safety means is secured, and further, safety standard requirements of the automobile field are satisfied.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
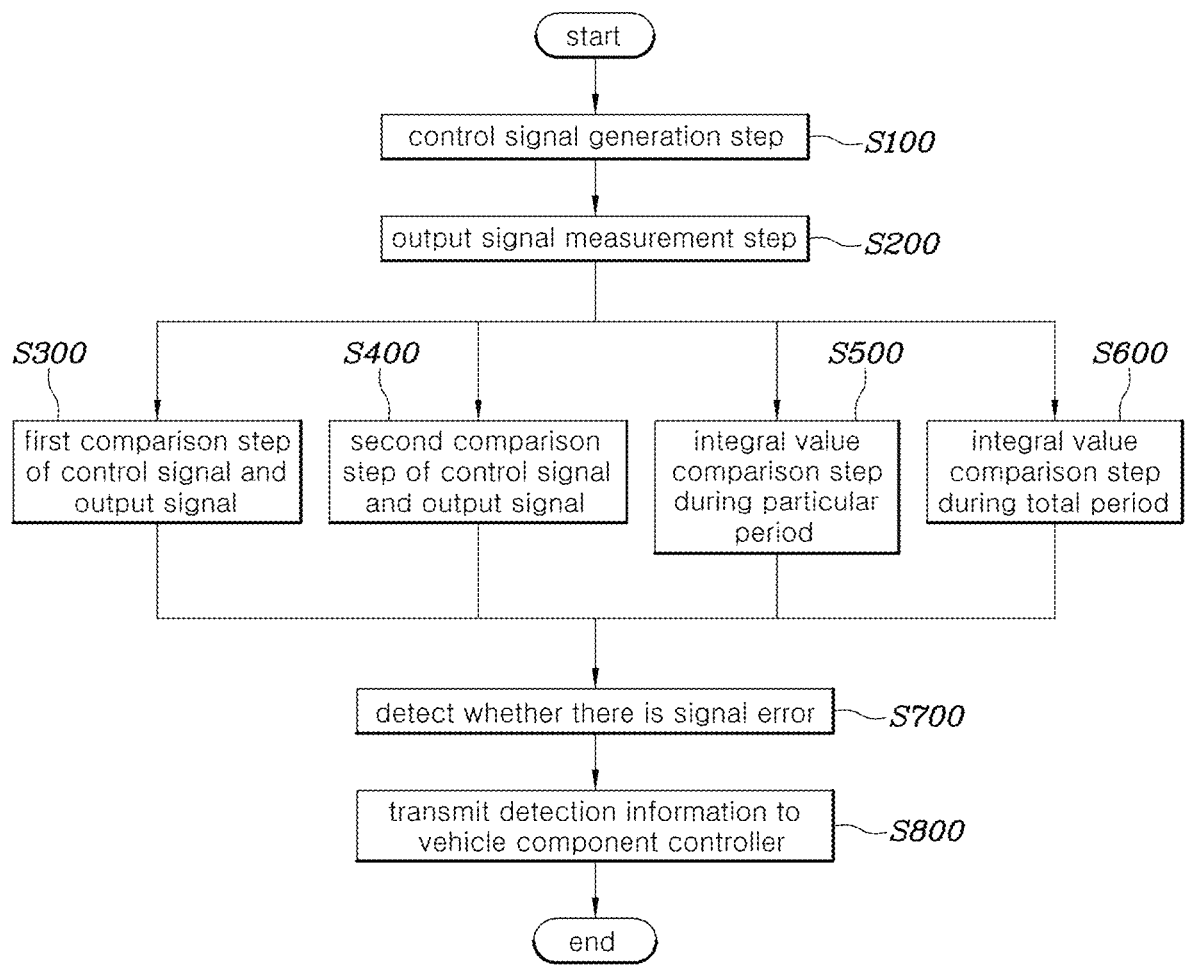
FIG. 1 is a flowchart showing a method of detecting normality of a PWM signal according to an embodiment of the present disclosure.

In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

In addition, terms "first", "second", etc. used in the specification can be used to describe various elements, but the elements are not to be construed as being limited to the terms. The terms are only used to differentiate one element from other elements.

In describing an embodiment disclosed in the present specification, if it is decided that a detailed description of the known art related to the present disclosure makes the subject matter of the embodiment disclosed in the present specification unclear, the detailed description will be omitted. In addition, the accompanying drawings are only for easy understanding of the embodiment disclosed in the present specification, and do not limit the technical idea disclosed in the present specification. In addition, it is to be understood that the present disclosure includes all modifications, equivalents, and substitutions included in the spirit and the scope of the present disclosure.

Controllers 11 and 20 according to an embodiment disclosed in the present specification may each include: a communication device for communicating with other controllers or a sensor so as to control a function in charge; a memory storing operating system or logic instructions and input/output information; and one or more processors performing determination, operation, decision, etc. required for controlling a function in charge.

Hereinafter, the configuration and operation of various embodiments of the present disclosure will be described in detail with reference to the accompanying drawings. Throughout the drawings, like or similar elements are denoted by the same reference numerals, and a redundant description thereof will be omitted.

Figure 3:
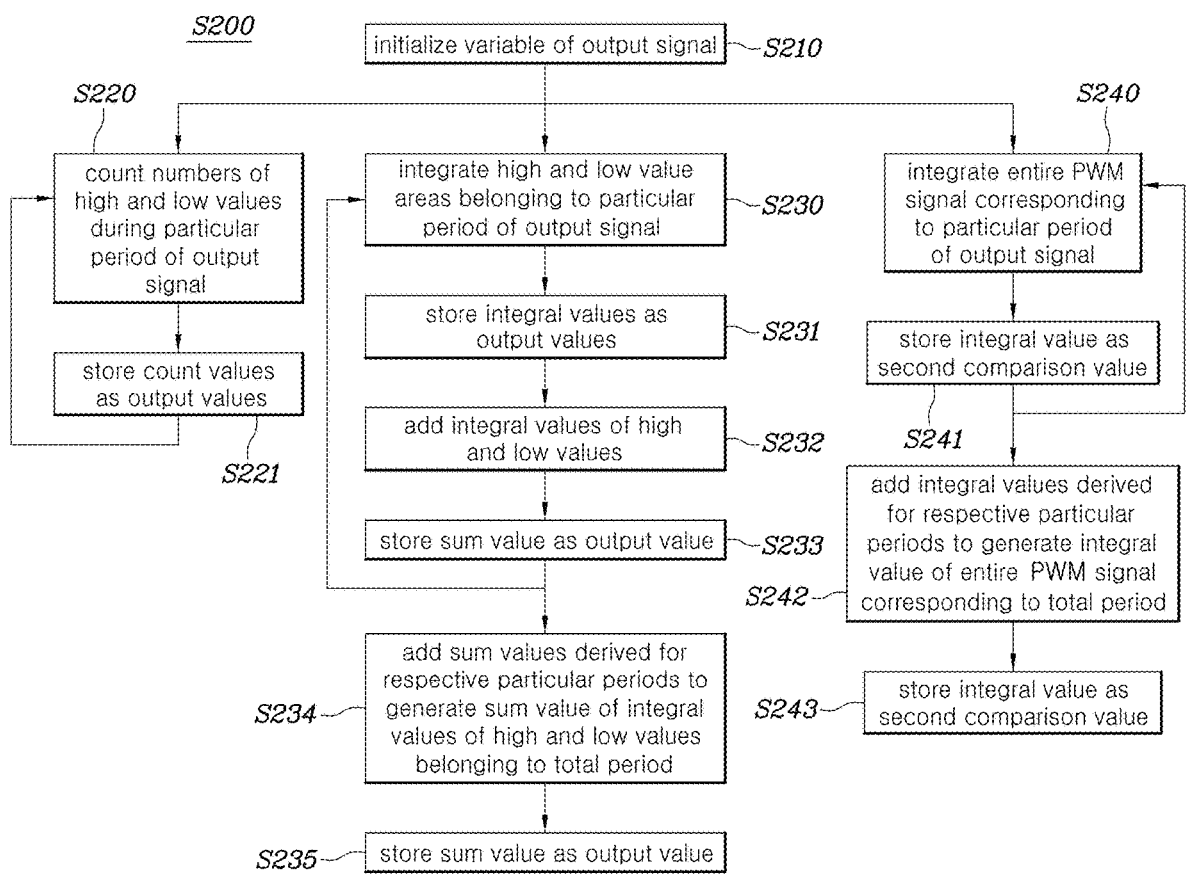
FIG. 3 is a flowchart showing a counting step and an integrating step in a method of detecting normality of a PWM signal according to an embodiment of the present disclosure.

FIG. 1 is a flowchart showing a method of detecting normality of a PWM signal according to an embodiment of the present disclosure. FIG. 3 is a flowchart showing a counting step and an integrating step in a method of detecting normality of a PWM signal according to an embodiment of the present disclosure.

Referring to FIGS. 1 and 3, according to the present disclosure, there is provided a method of detecting whether a PWM signal transmitted from an airbag controller to a vehicle component controller is normal, the method including: counting high values and low values of the PWM signal; integrating the high values and the low values of the PWM signal; comparing count results of the high values and the low values to first comparison values, and comparing integration results of the high values and the low values to second comparison values; and detecting whether the PWM signal is normal by separately deriving diagnosis results according to comparison with the count results and diagnosis results according to comparison with the integration results.

To help the understanding of the disclosure, a control signal generation step S100 shown in FIG. 1 will be described. In the method of detecting normality of a PWM signal according to the present disclosure, a control signal is generated for comparison with an actual output signal. The control signal is a PWM signal and is generated to a preset value. That is, the PWM signal may be generated with a particular ratio and a particular period. The generated PWM signal is used as a reference value for comparison with an actual output signal, wherein varied actual output signals may be measured due to unexpected vibration or shock during the driving of a vehicle.

In the meantime, an output signal measurement step S200 shown in FIG. 1 refers to the counting step and the integrating step of the method of detecting normality of a PWM signal according to the embodiment of the present disclosure. In the counting step and the integrating step of the present disclosure, not the preset control signal but an actually measured output signal is subjected to counting or integration and the number and an integral value are measured. That is, the output signal measurement step S200 shown in FIG. 1 is used as a term including both the counting step and the integrating step of the method of detecting normality of a PWM signal according to the embodiment of the present disclosure. This statement should not be construed as limiting each step of the present disclosure.

In the meantime, generally, a safety analysis in an automobile industry field detects two items, failure frequency and failure recognition. To determine the failure frequency, a quantitative analysis is used, and to recognize a failure, a qualitative analysis is used.

In the present disclosure, in the counting step and the comparison step corresponding thereto, count results are compared with first comparison values to detect failure frequency, and in the integrating step and the comparison step corresponding thereto, integration results are compared with second comparison values to recognize failures. That is, the process of deriving a diagnosis result by comparing count results with first comparison values in the counting step and the comparison step corresponding thereto is a self-test logic for determining failure frequency. The processes of deriving diagnosis results by comparing integration results with second comparison values in the integrating step and the comparison step corresponding thereto are self-test logics for recognizing failures. In the meantime, the processes of deriving the diagnosis results according to the integrating step and the comparison step corresponding thereto may be made of three different logics according to the selection of a second comparison value.

That is, the present disclosure goes through four self-test logics, and the four self-test logics are shown as four comparison steps S300, S400, S500, and S600 of FIG. 1 separately. In FIG. 1, the four comparison steps are shown as a first comparison step S300 of a control signal and an output signal, a second comparison step S400 of a control signal and an output signal, an integral value comparison step S500 during a particular period, and an integral value comparison step S600 during a total period. These are only used as terms to help the understanding of the disclosure, and this statement should not be construed as limiting each step of the present disclosure.

The diagnosis results derived according to the four self-test logics are classified into failure modes and categorized in the step of detecting whether there is a signal error in step S700, and are stored as detection information. The stored detection information is transmitted to the vehicle component controller in step S800, and may be used as information for determining the consistency of the PWM signal.

Consequently, the present disclosure generates information for determining the consistency of the PWM signal by detecting whether the PWM signal is normal through the four different self-test logics.

In the meantime, referring to FIG. 3, in the counting step and the integrating step, it is general to initialize a variable of each step and proceed in step S210 before each operation is performed. Accordingly, redundant data remaining in the memory is deleted to increase processing speed, and an error that may occur due to influence from the redundant data is prevented so that an accurate value is calculated.

Hereinafter, the configuration and operation of each step of the present disclosure will be described with reference to FIGS. 2 to 10.

FIG. 3 is a flowchart showing a counting step and an integrating step in a method of detecting normality of a PWM signal according to an embodiment of the present disclosure.

Referring to the left part of FIG. 3, in the counting step according to the present disclosure, the number of high values and the number of low values are separately detected during a particular period of the PWM signal in step S220.

In general, a PWM signal has high values and low values that are repeatedly generated with a particular ratio during a particular period with a duty ratio change method. Herein, duty values (logic values according to a high value and a low value) may be values equal to or greater than 0 and equal to or less than 1 when the maximum value of a reference wave is 1. That is, a logic value according to a high value is 1, and a logic value according to a low value is 0.

Specifically, in the counting step, the number of times that the logic value of 1 according to the high value of the output PWM signal is detected and the number of times that the logic value of 0 according to the low value of the output PWM signal is detected are counted in step S220.

In the case in which distortion occurs in the PWM signal or a noise is mixed therewith, when the desired number of occurrences of the signal (control value) is compared to the number of actual detections (output value), a difference may occur within or out of an error range. That is, when the difference is out of the error range, detection as an error may be performed. To this end, it is needed to detect the number of high values and the number of low values.

In the meantime, respective count values are stored as output values in step S221, and this process is repeated every particular period. The count values for the high values and the low values are stored as output values every particular period during a preset total period.

That is, on the basis of the number of detections during a particular period, an error between a control value and an output value is determined to precisely detect an error that may occur every particular period.

Referring to the middle part of FIG. 3, in the integrating step according to the present disclosure, a high value area and a low value area belonging to a particular period of the PWM signal may be separately integrated in step S230.

During the driving of a vehicle, generally, an actually measured PWM signal is output as an irregular waveform due to various causes such as a vibration and a shock of the vehicle. Therefore, in comparing a desired control value of the signal with an actually measured output value, a difference may occur in or out of an error range.

In addition, the high values and low values of the PWM signal are expressed in the form of a continuous function over time. Therefore, high values and low values detected during a particular period are integrated, so that actual values of a high value area and a low value area belonging to the particular period may be calculated within a minimum error range.

That is, integration results of high values and low values detected during a particular period are set as output values, the output values are compared with a control value, and when results of comparison are out of an error range, detection as an error is performed.

In the meantime, respective integral values are stored as output values in step S231, and this process is repeated every particular period. The integral values of the high values and the low values are stored as output values every particular period during a preset total period.

That is, determination is based on integral values detected during a particular period so that an error that may occur every particular period is precisely detected.

Further referring to the lower part of the middle part of FIG. 3, in the integrating step according to the present disclosure, high value areas and low value areas belonging to a total period of the PWM signal are separately integrated, and the total period of the PWM signal is predetermined and may be the sum of particular periods of the PWM signal in steps S230, S231, S232, S233, S234, and S235.

Describing this in detail, a high value area and a low value area belonging to a particular period of the PWM signal are separately integrated in step S230, respective integral values are stored as output values in step S231, the respective integral values are added in step S232, and the sum value is stored as another output value in step S233. This process is repeated every particular period, so that the sum value of the integral values of the high values and the low values is stored as an output value every particular period during a preset total period. Further, sum values derived for the respective particular periods through this process are added to generate a sum value of the integral values of the high values and the low values belonging to a total period in step S234, and the generated sum value is stored as another output value in step S235.

Herein, the integral values and the sum values stored as output values are stored separately as different information values, and according to the order in which the information values are stored, the information value stored earlier is not learned or changed by the information value stored later.

As described above, determination is based on integral values detected fora particular period, so that an error corresponding to a value out of an error range in a total period is detected. Even though an error that may occur every particular period is precisely detect, the larger the difference between a particular period and a total period (that is, the longer the time interval of a total period compared to the time interval of a particular period), the more difficult the detection of the error because the error corresponds a value in an error range in a particular period.

That is, the sum values derived for the respective particular periods are added to generate a sum value of the integral values of the high values and the low values belonging to a total period. The sum value is compared to a comparison value corresponding thereto, so that the consistency of the signal is determined with respect to a particular period and also a total period, thus improving the reliability of the consistency of the signal.

In addition, since the sum value is generated by adding the previously calculated integral values of the high value areas and the low value areas, the already derived information values are used as they are, whereby the same operation is prevented from being repeatedly performed, the operation processing speed is improved, and the overload of the memory is reduced.

In the meantime, the right part of FIG. 3 shows the steps of generating and storing comparison values that correspond to a sum value of integral values of high values and low values belonging to a particular period generated as shown in the lower part of the middle part of FIG. 3, and to a sum value of integral values of high values and low values belonging to a total period in steps S240, S241, S242, and S243.

Describing this in detail, the steps of generating and storing a comparison value corresponding to a sum value of integral values of high values and low values belonging to a particular period will be described first. In this case, the entire PWM signal corresponding to a particular period of the PWM signal is integrated in step S240, and the integral value is stored as a second comparison value in step S241.

During the driving of a vehicle, generally, an actually measured PWM signal is output as an irregular waveform due to various causes such as a vibration and a shock of the vehicle. Accordingly, in addition to a part clearly detected as a high value and a part clearly detected as a low value, there may be an area that is detected as an intermediate value between the high value and the low value and is detected as neither a high value nor a low value.

The integral value of the entire PWM signal corresponding to a particular period is calculated including a signal detected as the intermediate value between the high value and the low value, so may have a difference in or out of an error range from a result of adding the integral values of the high values and the low values.

That is, when a result of comparing the sum value of the integral values of the high values and the low values belonging to a particular period with the entire PWM signal corresponding to the particular period is out of the error range, detection as an error is performed. Accordingly, the result is used as a reference for verifying the validity of the PWM signal for each particular period.

Next, the steps of generating and storing a comparison value corresponding to a sum value of integral values of high values and low values belonging to a total period will be described. In this case, the entire PWM signal corresponding to a particular period of the PWM signal is integrated in step S240, and an integral value is stored as a second comparison value in step S241. This process is repeated every particular period, so that an integral value of the PWM signal every particular period during a preset total period is stored as a second comparison value. Further, the integral values derived for the respective particular periods through this process are added to generate an integral value of the entire PWM signal corresponding to the total period in step S242, and the generated integral value is stored as another second comparison value in step S243.

Herein, the integral values stored as the second comparison values are stored separately as different information values, and according to the order in which the information values are stored, the information value stored earlier is not learned or changed by the information value stored later.

As described above, since the integral value of the entire PWM signal corresponding to a particular period is calculated including a signal detected as the intermediate value between the high value and the low value, the integral value of the entire PWM signal corresponding to the total period generated by adding the integral values of the respective entire PWM signals derived for the particular periods includes a signal detected as the intermediate value between the high value and the low value.

In addition, an error corresponding to a value out of an error range in a total period is detected. The larger the difference between a particular period and a total period (that is, the longer the time interval of a total period compared to the time interval of a particular period), the more difficult the detection of the error because the error corresponds to a value in an error range in a particular period.

That is, when a result of adding the integral values of the high values and the low values belonging to the total period is compared with the integral value of the entire PWM signal corresponding to the total period, there may be a difference in or out of an error range.

Consequently, by comparing the integral value of the entire PWM signal corresponding to the total period with the sum value of the integral values of the high values and the low values corresponding to the total period, the consistency of the signal is determined with respect to a particular period and also a total period, thus further improving the reliability of the consistency of the signal.

Figure 2:
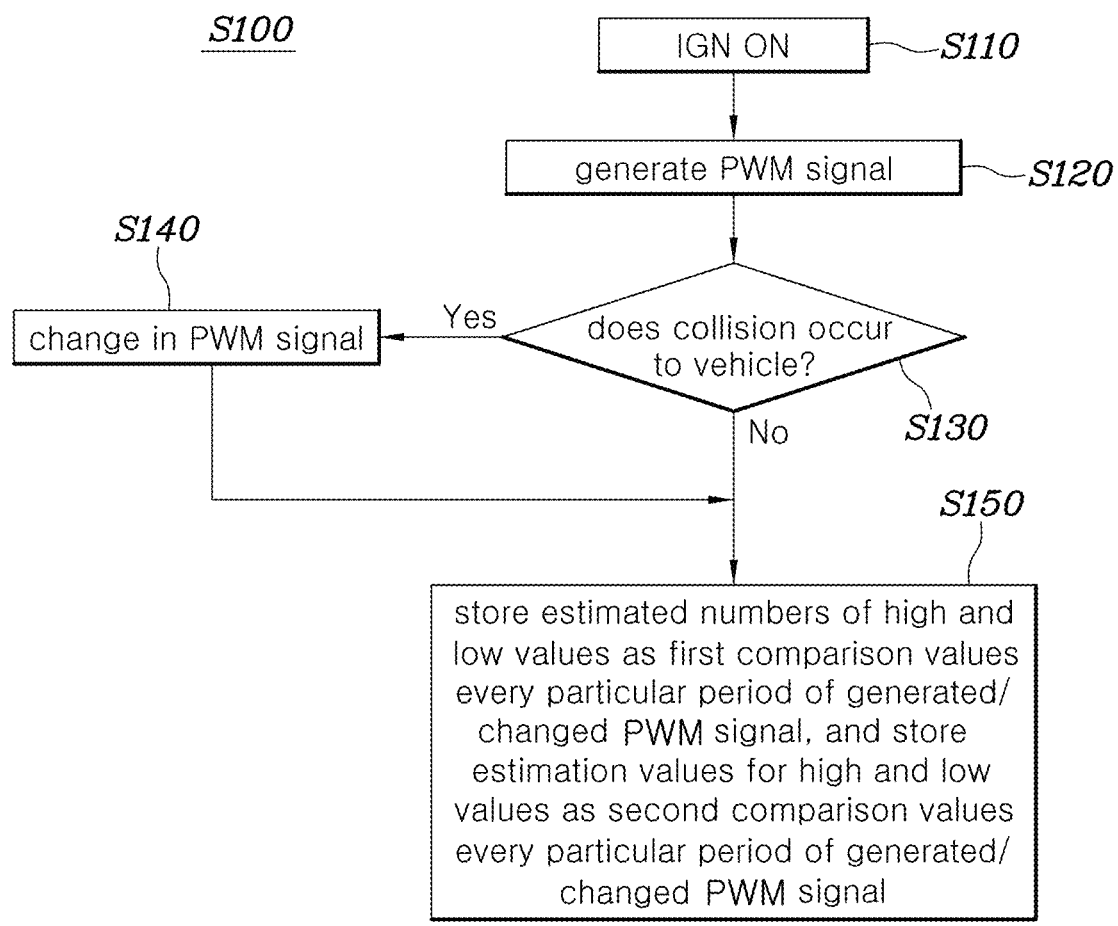
FIG. 2 is a flowchart showing a process of generating a preset PWM signal in a method of detecting normality of a PWM signal according to an embodiment of the present disclosure.
Figure 4:
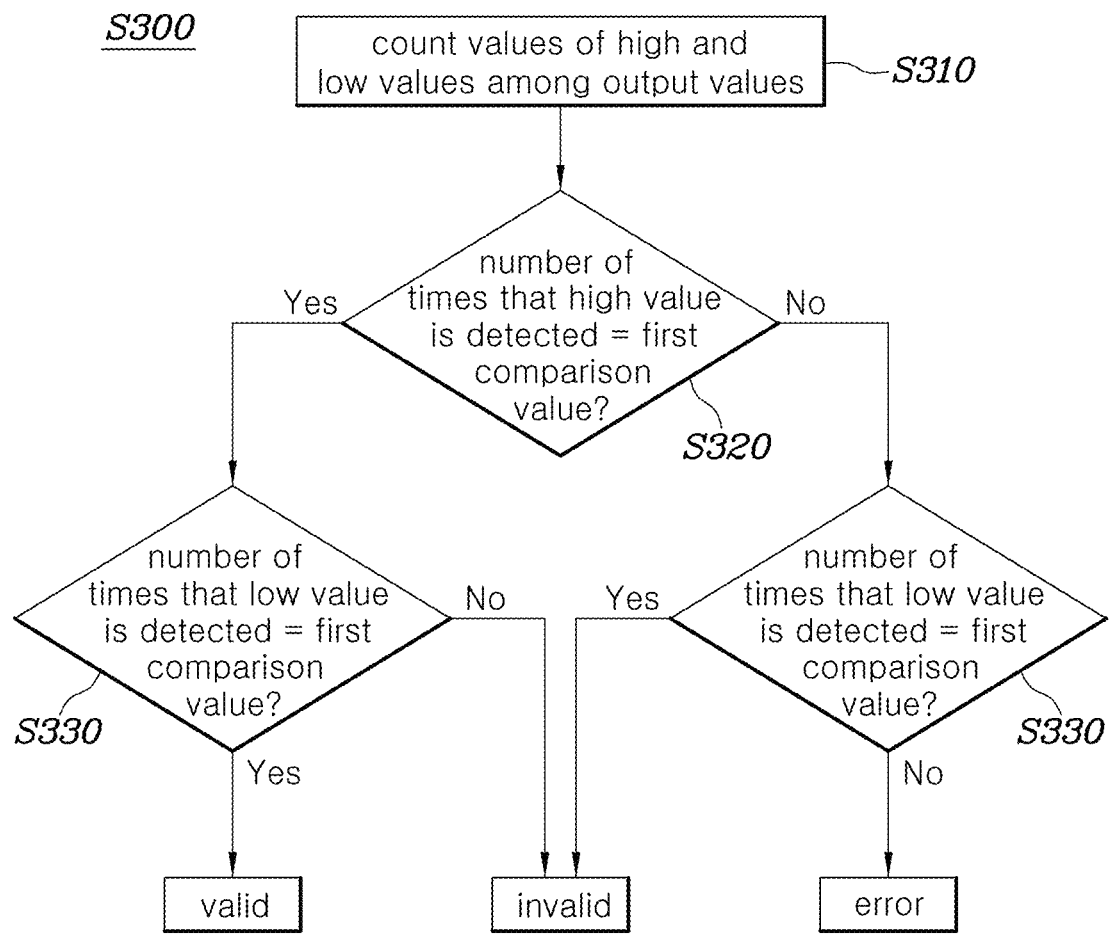
FIG. 4 is a flowchart showing a process of deriving a diagnosis result according to a counting step and a comparison step corresponding thereto in a method of detecting normality of a PWM signal according to an embodiment of the present disclosure.

FIG. 2 is a flowchart showing a process of generating a preset PWM signal in a method of detecting normality of a PWM signal according to an embodiment of the present disclosure. FIG. 4 is a flowchart showing a process of deriving a diagnosis result according to a counting step and a comparison step corresponding thereto in a method of detecting normality of a PWM signal according to an embodiment of the present disclosure.

Referring to FIGS. 2 and 4, the first comparison values according to the present disclosure are provided in advance as contrast values corresponding to a high value and a low value, respectively, and in the comparison step, the first comparison values may be compared with count results of the high values and the low values.

In general, a PWM signal has high values and low values that are repeatedly generated with a particular ratio during a particular period with a duty ratio change method. Herein, duty values (logic values according to a high value and a low value) may be values equal to or greater than 0 and equal to or less than 1 when the maximum value of a reference wave is 1. That is, a logic value according to a high value is 1, and a logic value according to a low value is 0.

For example, assuming a high value of 60, a low value of 40, and a frequency of 100 Hz, in general, one period of a signal is 10 ms and transmission is performed with a high value:low value ratio of 6:4. Therefore, in this case, the first comparison values are 6 and 4, wherein 6 is the estimated number of times that the logic value of 1 according to the high value is detected (the contrast value corresponding to the high values) and 4 is the estimated number of times that the logic value of 0 according to the low value is detected (the contrast value corresponding to the low values).

Therefore, when a period and a ratio of the PWM signal are preset to particular values, the estimated number of high values and the estimated number of low values are stored as first comparison values every particular period of the PWM signal generated/changed with the set period and ratio in step S150 to provide contrast values corresponding to actually measured high values and low values, respectively.

In the meantime, as described above with reference to FIG. 3, in the counting step, the number of times that the logic value of 1 according to the high value of the output PWM signal is detected and the number of times that the logic value of 0 according to the low value of the output PWM signal is detected are counted in step S220.

Referring to FIG. 4, in the counting step and the comparison step corresponding thereto, the count results of the high values and the low values are used as output values in step S310, and the count results of the high values and the low values are compared to the first comparison values in steps S320 and S330.

Describing this in detail, the number of times that the high value is detected among the output values is compared to the estimated number of high values among the first comparison values in step S320, and the number of times that the low value is detected among the output values is compared to the estimated number of low values among the first comparison values in step S330. When the comparison result shows agreement, the logic value of 1 is derived as a result value, or when the comparison result shows disagreement, the logic value of 0 is derived as a result value.

In the meantime, in the present disclosure, the particular period does not have to be one period, and several periods may be set as one particular unit. Hereinafter, to help the understanding of the disclosure, a detailed description will be given with one period as an example.

If the number of times that the logic value of 1 or 0 is detected during one period is 7 or 3 (7 is for the logic value of 1, and 3 is for the logic value of 0), the number of the logic values of 1 does not match the estimated number and a result value thereof is 0, and the number of the logic values of 0 does not match the estimated number and a result value thereof is 0, and thus a value "error" of 00 is output.

If the number of times that the logic value of 1 or 0 is detected during one period is 6 or 3 (6 is for the logic value of 1, and 3 is for the logic value of 0), the number of the logic values of 1 matches the estimated number and a result value thereof is 1, and the number of the logic values of 0 does not match the estimated number and a result value thereof is 0, and thus a value "invalid" of 10 is output.

If the number of times that the logic value of 1 or 0 is detected during one period is 7 or 4 (7 is for the logic value of 1, and 4 is for the logic value of 0), the number of the logic values of 1 does not match the estimated number and a result value thereof is 0, and the number of the logic values of 0 matches the estimated number and a result value thereof is 1, and thus a value "invalid" of 01 is output.

If the number of times that the logic value of 1 or 0 is detected during one period is 6 or 4 (6 is for the logic value of 1, and 4 is for the logic value of 0), the number of the logic values of 1 matches the estimated number and a result value thereof is 1, and the number of the logic values of 0 matches the estimated number and a result value thereof is 1, and thus a value "valid" of 11 is output.

Through this process, in the counting step and the comparison step corresponding thereto, the number of high values and the number of low values are detected during a particular period of the PWM signal, and the numbers are compared to the contrast values respectively corresponding to the high values and the low value during the particular period to output logic values, thereby categorizing diagnosis results.

By categorizing the diagnosis results as described above, this may be used as information for counting the number of times that an error has occurred during the total time, and ultimately, may be used as a method of reducing an RPN value according to an FMEA method.

Figure 5:
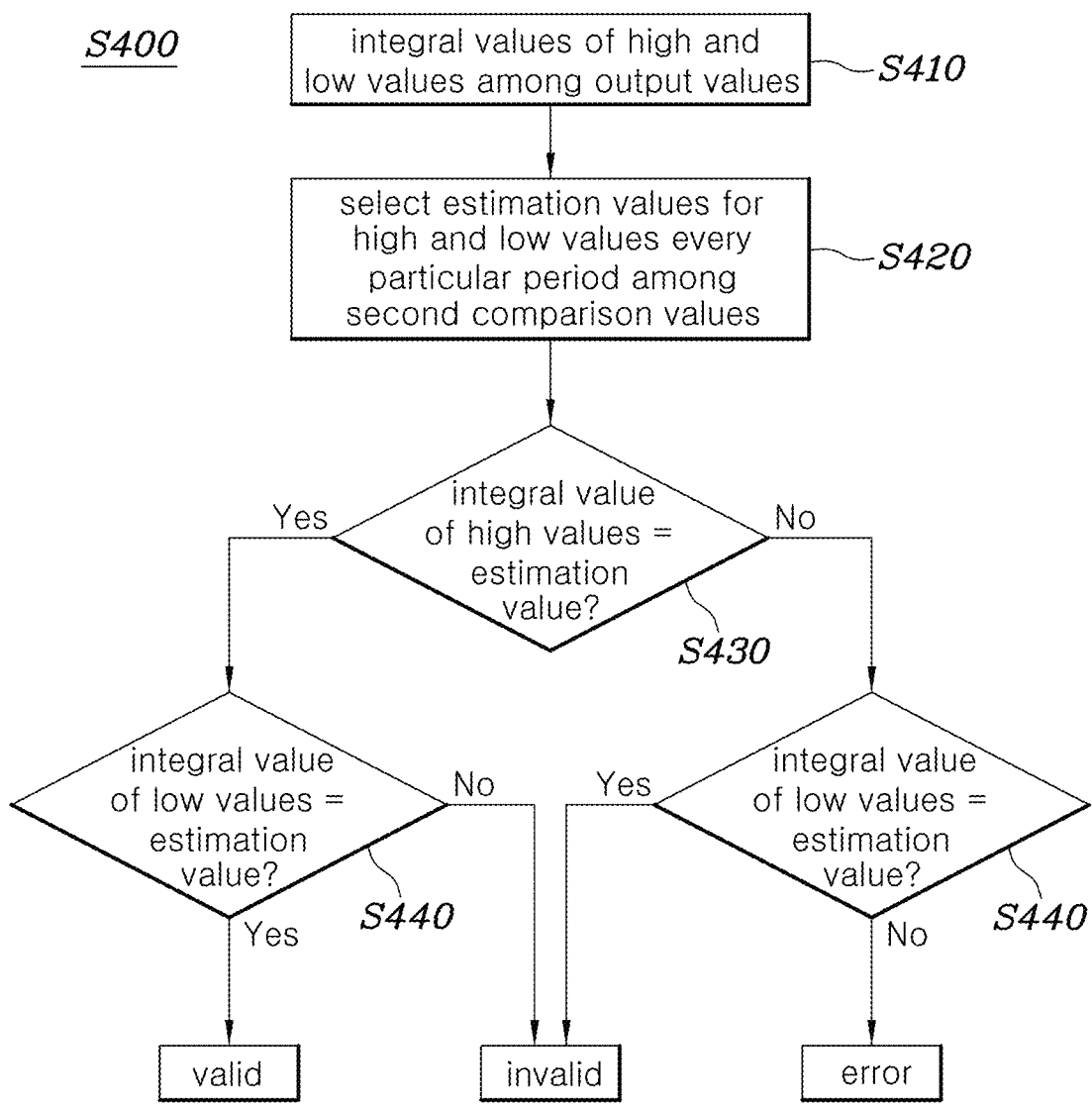
FIG. 5 is a flowchart showing a first derivation process of a diagnosis result according to an integrating step and a comparison step corresponding thereto in a method of detecting normality of a PWM signal according to an embodiment of the present disclosure.

FIG. 2 is a flowchart showing a process of generating a preset PWM signal in a method of detecting normality of a PWM signal according to an embodiment of the present disclosure. FIG. 5 is a flowchart showing a first derivation process of a diagnosis result according to an integrating step and a comparison step corresponding thereto in a method of detecting normality of a PWM signal according to an embodiment of the present disclosure.

Referring to FIGS. 2 and 5, the second comparison values according to the present disclosure are provided in advance as contrast values corresponding to a high value and a low value, respectively, and in the comparison step, the second comparison values may be compared with integration results of the high values and the low values.

In general, a PWM signal has high values and low values that are repeatedly generated with a particular ratio during a particular period with a duty ratio change method. The high values and low values of the PWM signal are expressed in the form of a continuous function overtime. Therefore, high values and low values detected during a particular period are integrated, so that actual values of a high value area and a low value area belonging to the particular period may be calculated within a minimum error range.

For example, assuming that a PWM signal is transmitted with a high value:low value ratio of 6:4 during one period, the second comparison values are 6 and 4, wherein 6 is an estimation value for the high values (the contrast value corresponding to the high values) and 4 is an estimation value for the low values (the contrast value corresponding to the low values).

Therefore, when a period and a ratio of the PWM signal are preset to particular values, the estimation value for high values and the estimation value for low values are stored as second comparison values every particular period of the PWM signal generated/changed with the set period and ratio in step S150 to provide contrast values corresponding to actually measured high values and low values, respectively.

In the meantime, as described above with reference to FIG. 3, in the integrating step according to the present disclosure, a high value area and a low value area belonging to a particular period of the PWM signal may be separately integrated in step S230.

Referring to FIG. 5, in the integrating step and the comparison step corresponding thereto, the integration results of the high values and the low values are used as output values in step S410, the estimation values for the high values and the low values are used as second comparison values every particular period in step S420, and the integration results of the high values and the low values are compared to the second comparison values in steps S430 and S440.

Describing this in detail, the integral value of the high values among the output values is compared to the estimation value for the high values among the second comparison values in step S430, and the integral value of the low values among the output values is compared to the estimation value for the low values among the second comparison values in step S440. When the comparison result shows agreement, the logic value of 1 is derived as a result value, or when the comparison result shows disagreement, the logic value of 0 is derived as a result value.

In the meantime, a count result in the counting step is the number of detections and is thus necessarily expressed as an integer, but an actual value (estimation value) in the integrating step is not necessarily an integer. Therefore, even though an actual value does not match a predetermined estimation value, when the actual value is in a particular error range, a result value of 1 is output, or when the actual value is out of the particular error range, a result value of 0 is output. Hereinafter, to help the understanding of the disclosure, a description is given expressing an actual value as an integer, and this statement should not be construed as limiting the contents of the present disclosure.

In addition, in the present disclosure, the particular period does not have to be one period, and several periods may be set as one particular unit. Hereinafter, to help the understanding of the disclosure, a description will be given with one period as an example.

If an actual value calculated within a minimum error range during one period is 7:3 (7 is for the high values, and 3 is for the low values), the actual value for the high values does not match the estimation value and a result value thereof is 0, and the actual value for the low values does not match the estimation value and a result value thereof is 0, and thus a value "error" of 00 is output.

If an actual value calculated within a minimum error range during one period is 6:3 (6 is for the high values, and 3 is for the low values), the actual value for the high values matches the estimation value and a result value thereof is 1, and the actual value for the low values does not match the estimation value and a result value thereof is 0, and thus a value "invalid" of 10 is output.

If an actual value calculated within a minimum error range during one period is 7:4 (7 is for the high values, and 4 is for the low values), the actual value for the high values does not match the estimation value and a result value thereof is 0, and the actual value for the low values matches the estimation value and a result value thereof is 1, and thus a value "invalid" of 01 is output.

If an actual value calculated within a minimum error range during one period is 6:4 (6 is for the high values, and 4 is for the low values), the actual value for the high values matches the estimation value and a result value thereof is 1, and the actual value for the low values matches the estimation value and a result value thereof is 1, and thus a value "valid" of 11 is output.

Through this process, in the integrating step and the comparison step corresponding thereto, integral values of high values and low values are detected during a particular period of the PWM signal, and the integral values are compared to the contrast values respectively corresponding to the high values and the low values during the particular period to output logic values, thereby categorizing diagnosis results.

By categorizing the diagnosis results as described above, this may be used as information for detecting which of a high value and a low value has an error, and ultimately, may be used as a method of reducing an RPN value according to an FMEA method.

Figure 6:
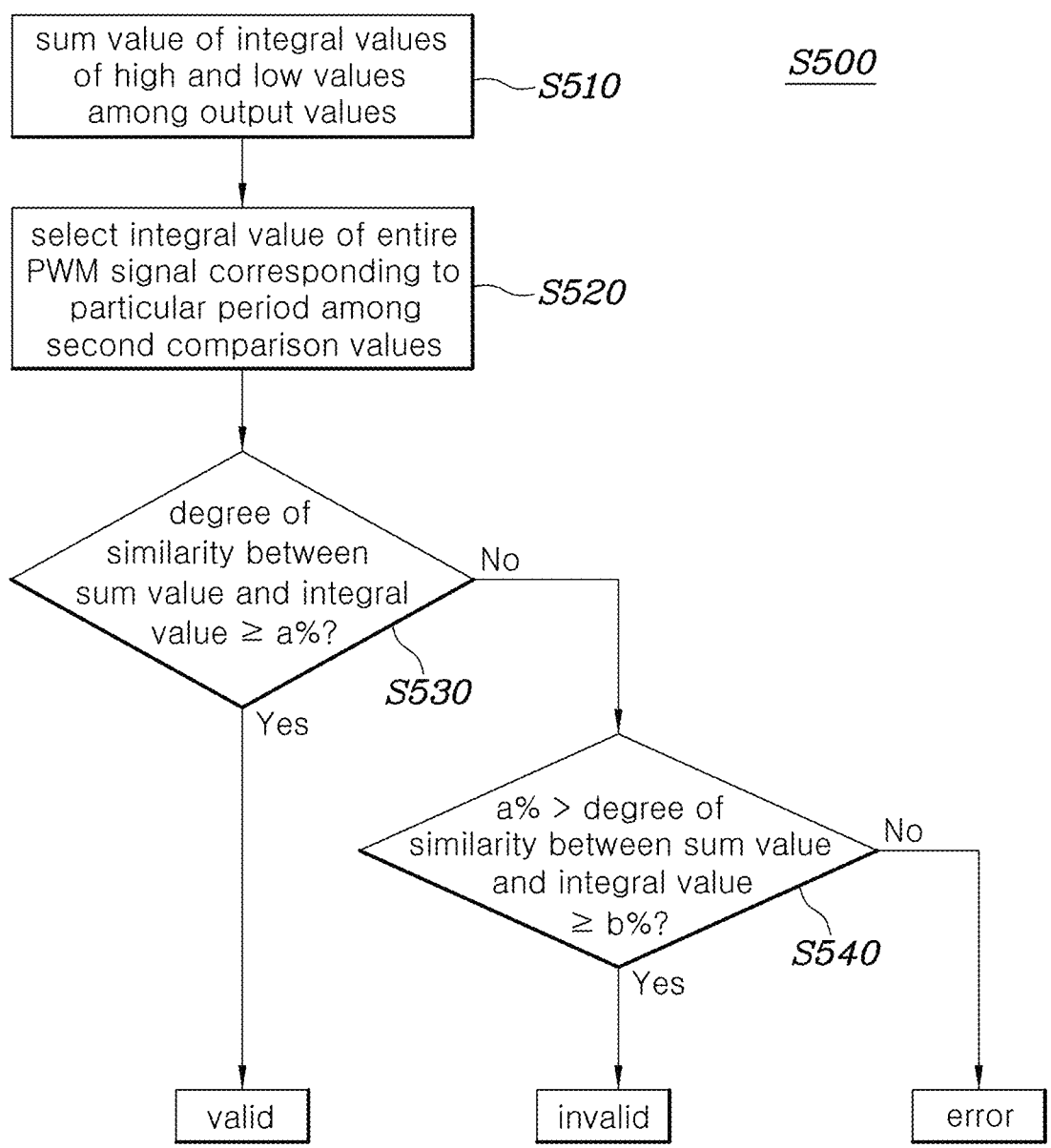
FIG. 6 is a flowchart showing a second derivation process of a diagnosis result according to an integrating step and a comparison step corresponding thereto in a method of detecting normality of a PWM signal according to an embodiment of the present disclosure.

FIG. 3 is a flowchart showing a counting step and an integrating step in a method of detecting normality of a PWM signal according to an embodiment of the present disclosure. FIG. 6 is a flowchart showing a second derivation process of a diagnosis result according to an integrating step and a comparison step corresponding thereto in a method of detecting normality of a PWM signal according to an embodiment of the present disclosure.

As described above with reference to FIG. 3, in the integrating step according to the present disclosure, a high value area and a low value area belonging to a particular period of the PWM signal are separately integrated in step S230, respective integral values are stored as output values in step S231, the respective integral values are added in step S232, and the sum value is stored as another output value in step S233. This process is repeated every particular period, so that the sum value of the integral values of the high values and the low values is stored as an output value every particular period during a preset total period.

In addition, the entire PWM signal corresponding to a particular period of the PWM signal is integrated in step S240, and an integral value is stored as a second comparison value in step S241, so that a comparison value corresponding to a sum value of integral values of high values and low values belonging to a particular period is generated and stored.

Referring to FIG. 6, in the integrating step and the comparison step corresponding thereto according to the present disclosure, the sum value of the integral values of the high values and the low values is used as an output value in step S510, the integral value of the entire PWM signal corresponding to a particular period is used as a second comparison value in step S520, and the sum value of the integral values of the high values and the low values is compared to the second comparison value in steps S530 and S540.

Describing this in detail, the degree of similarity between the second comparison value and the sum value of the integral values of the high values and the low values is determined, and according to a determination result, diagnosis results are derived in steps S530 and S540. That is, unlike the first derivation process described above, in the case of the second derivation process of a diagnosis result according to the integrating step and the comparison step corresponding thereto in a method of detecting normality of a PWM signal according to an embodiment of the present disclosure, a threshold value for the degree of similarity may be determined to apply a determination value according to an error range.

As a method of obtaining the degree of similarity, Correlation function, Euclidean distance, Manhattan distance, and other general mathematical techniques may be used. Hereinafter, error range determination using the degree of similarity will be described in detail with an example.

The result of adding integral values of a high value area and a low value area belonging to one period is compared to the second comparison value, and when the degree of similarity is equal to or greater than 95% (the degree of similarity between the sum value and the integral value a % in FIG. 6), a value "valid" is output.

The result of adding the integral values of the high value area and the low value area belonging to one period is compared to the second comparison value, and when the degree of similarity is equal to or greater than 90% and less than 95% (a %>the degree of similarity between the sum value and the integral value b % in FIG. 6), a value "invalid" is output.

The result of adding the integral values of the high value area and the low value area belonging to one period is compared to the second comparison value, and when the degree of similarity is less than 90%, a value "error" is output.

Through this process, in the integrating step and the comparison step corresponding thereto, integral values of high values and low values during a particular period of the PWM signal are detected, and a result of adding the integral values is compared to the integral value of the entire PWM signal corresponding to a particular period to output logic values, thereby categorizing diagnosis results.

By categorizing the diagnosis results as described above, an error that may occur every particular period is detected and the point in time at which an error occurs during a particular period is recognized, and ultimately, may be used as a method of reducing an RPN value according to an FMEA method.

In the meantime, a % and b % shown in FIG. 6 are values that may vary according to a desired level. In this example, setting a % to 95% and b % to 90% is only used to help the understanding of the disclosure, and is not limited to these figures.

Figure 7:
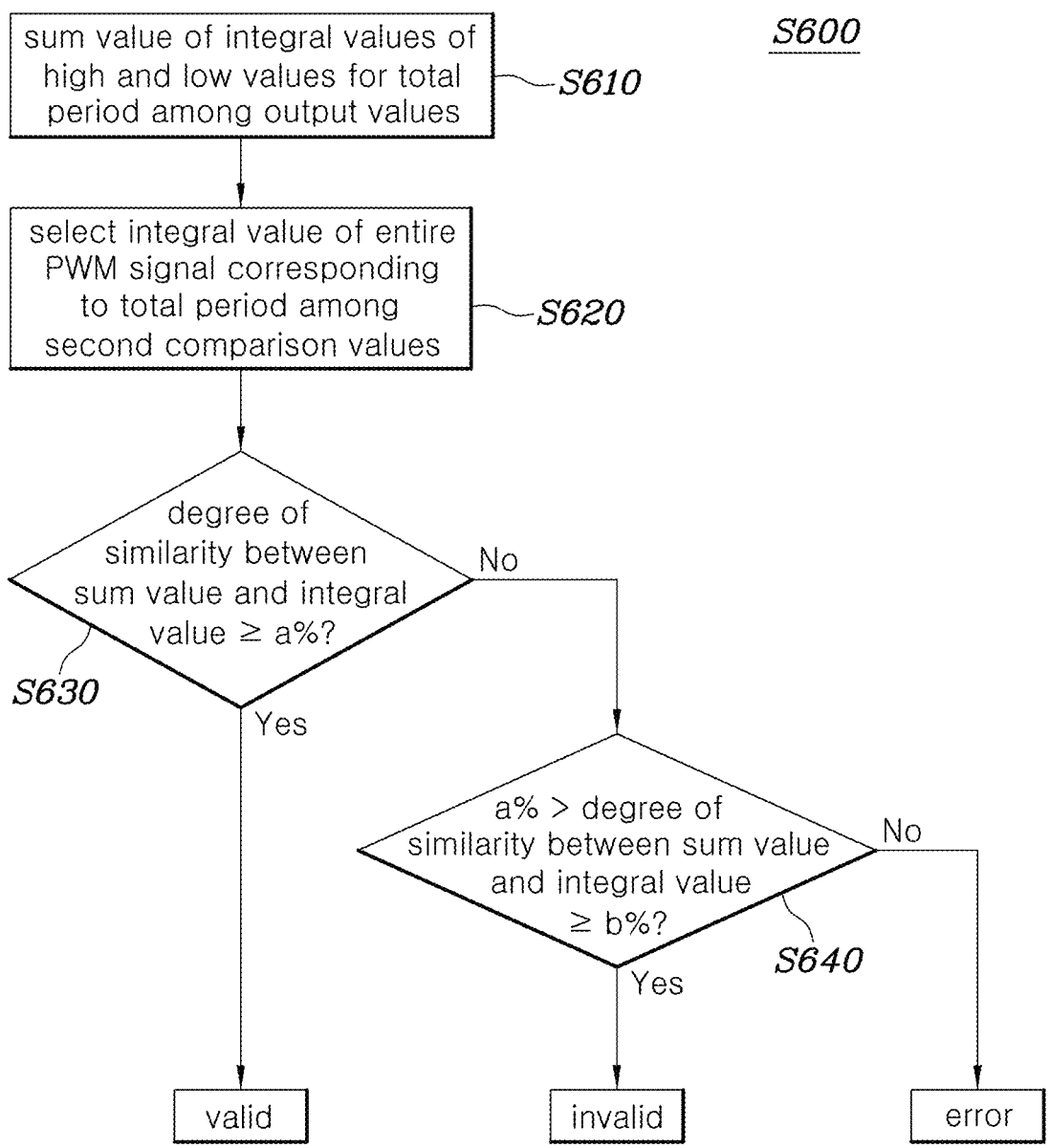
FIG. 7 is a flowchart showing a third derivation process of a diagnosis result according to an integrating step and a comparison step corresponding thereto in a method of detecting normality of a PWM signal according to an embodiment of the present disclosure.

FIG. 3 is a flowchart showing a counting step and an integrating step in a method of detecting normality of a PWM signal according to an embodiment of the present disclosure. FIG. 7 is a flowchart showing a third derivation process of a diagnosis result according to an integrating step and a comparison step corresponding thereto in a method of detecting normality of a PWM signal according to an embodiment of the present disclosure.

As described above with reference to FIG. 3, in the integrating step according to the present disclosure, a high value area and a low value area belonging to a particular period of the PWM signal are separately integrated in step S230, respective integral values are stored as output values in step S231, the respective integral values are added in step S232, and the sum value is stored as another output value in step S233. This process is repeated every particular period, so that the sum value of the integral values of the high values and the low values is stored as an output value every particular period during a preset total period. Further, sum values derived for the respective particular periods through this process are added to generate a sum value of the integral values of the high values and the low values belonging to a total period in step S234, and the generated sum value is stored as another output value in step S235.

In addition, the entire PWM signal corresponding to a particular period of the PWM signal is integrated in step S240, and an integral value is stored as a second comparison value in step S241, so that a comparison value corresponding to a sum value of integral values of high values and low values belonging to a particular period is generated and stored. Further, the integral values derived for the respective particular periods through this process are added to generate an integral value of the entire PWM signal corresponding to the total period in step S242, and the generated integral value is stored as another second comparison value in step S243.

Referring to FIG. 7, in the integrating step and the comparison step corresponding thereto according to the present disclosure, the sum value of the integral values of the high values and the low values belonging to the total period is used as an output value in the step S610. The integral value of the entire PWM signal corresponding to the total period is used as a second comparison value in the step S620. The sum value of the integral values of the high values and the low values during the total period is compared to the second comparison value in steps S630 and S640.

Describing this in detail, the degree of similarity between the second comparison value and the sum value of the integral values of the high values and the low values during the total period is determined, and according to a determination result, diagnosis results are derived in steps S630 and S640.

In this case, similarly to the second derivation process described above, a threshold value for the degree of similarity may be determined to apply a determination value according to an error range. As a method of obtaining the degree of similarity, Correlation function, Euclidean distance, Manhattan distance, and other general mathematical techniques may be used.

The sum of the integral values of the high values and the low values during the total period is compared to the second comparison value, and when the degree of similarity is equal to or greater than 95% (the degree of similarity between the sum value and the integral value a % in FIG. 7), a value "valid" is output.

The sum of the integral values of the high values and the low values during the total period is compared to the second comparison value, and when the degree of similarity is equal to or greater than 90% and less than 95% (a %>the degree of similarity between the sum value and the integral value b % in FIG. 7), a value "invalid" is output.

The sum of the integral values of the high values and the low values during the total period is compared to the second comparison value, and when the degree of similarity is less than 90%, a value "error" is output.

Through this process, in the integrating step and the comparison step corresponding thereto, integral values of high values and low values during the total period of the PWM signal are detected, and a result of adding the integral values is compared to the integral value of the entire PWM signal corresponding to the total period to output logic values, thereby categorizing diagnosis results.

By categorizing the diagnosis results as described above, an error that is not detected for a particular period is detected, thus improving the reliability of the consistency of the signal. In addition, the section at which an error has occurred during the total period is determined, and ultimately, may be used as a method of reducing an RPN value according to an FMEA method.

In the meantime, a % and b % shown in FIG. 7 are values that may vary according to a desired level. In this example, setting a % to 95% and b % to 90% is only used to help the understanding of the disclosure, and is not limited to these figures.

Figure 8:
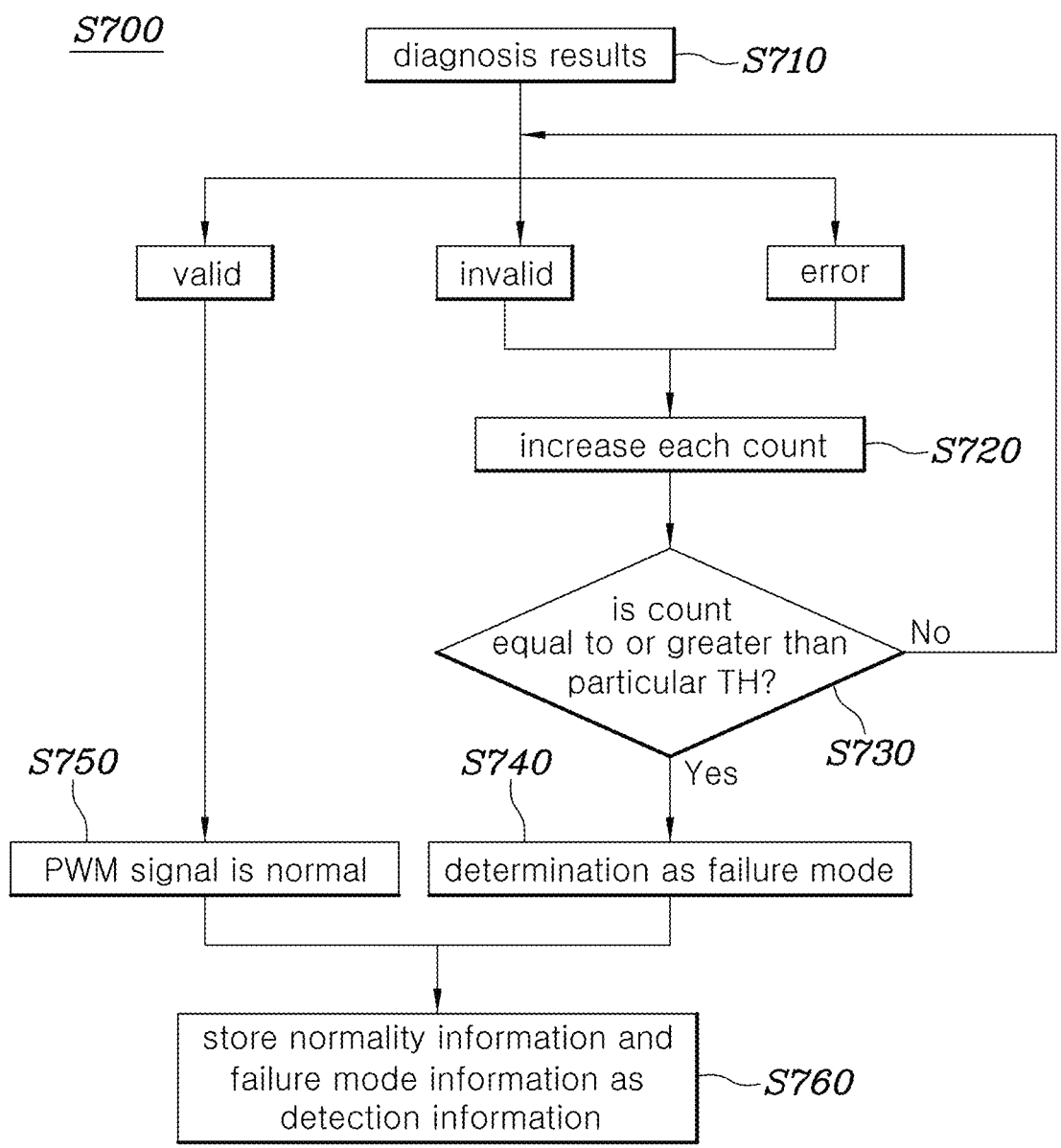
FIG. 8 is a flowchart showing a detecting step in a method of detecting normality of a PWM signal according to an embodiment of the present disclosure.

FIG. 8 is a flowchart showing a detecting step in a method of detecting normality of a PWM signal according to an embodiment of the present disclosure.

Referring to FIG. 8, in the detecting step in the method of detecting normality of the PWM signal according to the present disclosure, separately derived diagnosis results are individually counted, and when each of the count values is equal to greater than a preset count value, it is determined whether a signal transmission system has failed.

As described above with reference to FIGS. 4 to 7, the four different self-test logics of the present disclosure output three diagnosis results "valid", "invalid", and "error" in step S710. Herein, the result values recognized as errors in the PWM signal are values "invalid" and "error" excluding a value "valid". That is, classification into two types of result values is made for each one test logic, and categorization into a total of eight types of failure mode information is made.

By using the failure mode information categorized as described above, it is determined whether a safety goal is attained and normal operation is achieved. Further, warning references for new and unexpected risks may be established.

In addition, among the values of the output diagnosis results in step S710, the values "invalid" and "error" meaningful as error detection items are recorded in the memory, so that a database (DB) according to each failure mode is created and accumulates.

Referring to FIG. 8, each time the same diagnosis results are generated, a count value of a recorded result value is increased in step S720. When the increased count value is equal to or greater than a preset particular threshold value in step S730, a failure mode based on the corresponding error information is determined in step S740.

By setting a limit on the number of repetitions of the count through a threshold value, infinitely repeated generation or infinite accumulation of the DB is prevented. By storing the determined failure mode information as detection information in step S760, further use of the detection information may be planned, such as being used as a method of reducing an RPN value according to an FMEA method.

In the meantime, among the diagnosis results, a value "valid" not recognized as an error in the PWM signal does not increase the count value even though the same diagnosis results are generated, and is used as normality information indicating that the PWM signal is transmitted normally in step S750. The normality information and the failure mode information are stored as detection information in step S760, and may be used as information for determining the consistency of the PWM signal.

Figure 9:
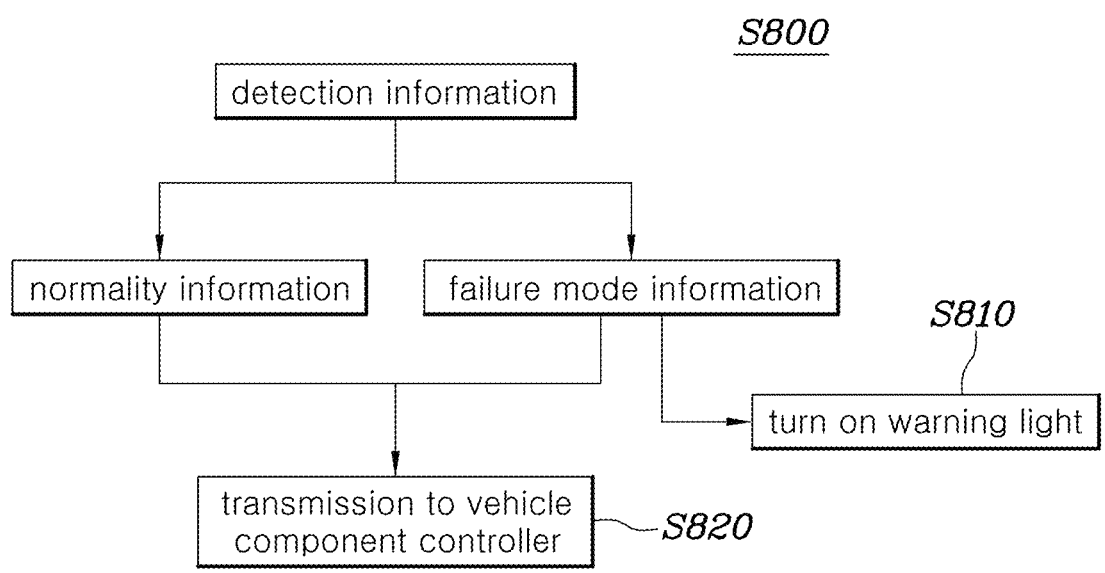
FIG. 9 is a flowchart showing transmission of detection information to another component controller of a vehicle in a method of detecting normality of a PWM signal according to an embodiment of the present disclosure.
Figure 10:
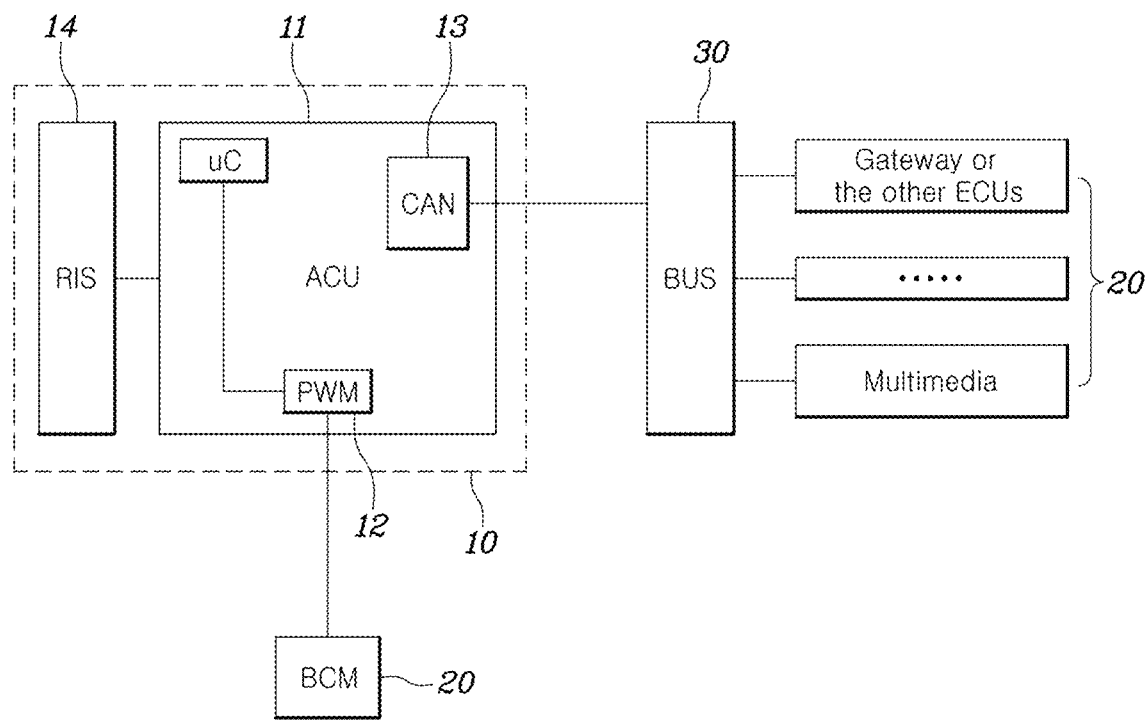
FIG. 10 is a structural diagram showing a system including a method of detecting normality of a PWM signal according to an embodiment of the present disclosure.

FIG. 2 is a flowchart showing a process of generating a preset PWM signal in a method of detecting normality of a PWM signal according to an embodiment of the present disclosure. FIG. 9 is a flowchart showing transmission of detection information to another component controller of a vehicle in a method of detecting normality of a PWM signal according to an embodiment of the present disclosure. FIG. 10 is a structural diagram showing a system including a method of detecting normality of a PWM signal according to an embodiment of the present disclosure.

Referring to FIGS. 2 and 10, the method of detecting normality of a PWM signal according to the present disclosure generates a PWM signal with a particular ratio and a particular period to a vehicle component controller 20 in step S120 from the point in time at which the vehicle is started in step S110. The generated PWM signal is used as a reference value for comparison with an actual value, wherein varied actual values may be measured due to unexpected vibration or shock during the driving of a vehicle.

That is, provided are reference values for detecting an error that may occur anytime in a general driving process during the driving of a vehicle. As described above with reference to FIG. 7, error information detected through reference values are categorized to determine whether the signal transmission system has failed.

Further, referring to FIG. 9, in the method of detecting normality of the PWM signal according to the present disclosure, an in-vehicle warning light may be turned on according to a result of the detecting step.

When it is determined that the signal transmission system has failed, the in-vehicle warning light is turned on in step S810, so that the user of the vehicle is informed of a risk and provided with a sufficient margin for safety.

In the meantime, the same steps are performed even when a collision occurs to a vehicle, so that whether the signal transmission system has failed is diagnosed. However, there is a difference in that when a collision occurs to a vehicle, the warning light is always turned on on the basis of the information received from a shock detection sensor 14 regardless of determination of whether a failure has occurred by the method of detecting normality of the PWM signal according to the present disclosure.

In this case, even when it is determined whether a failure has occurred by the method of detecting normality of the PWM signal according to the present disclosure and the warning light is thus turned on in step S810, the warning light has already been turned on on the basis of the information received from the shock detection sensor 14. Therefore, the lighting state of the warning light may not change.

Therefore, assuming the occurrence of a collision of the vehicle, an additional safety means may be secured to give an emergency alarm supplementally in case a receiver receiving information from the shock detection sensor 14 has a problem and the lighting of the warning light is abnormal.

FIG. 2 is a flowchart showing a process of generating a preset PWM signal in a method of detecting normality of a PWM signal according to an embodiment of the present disclosure. FIG. 10 is a structural diagram showing a system 10 including a method of detecting normality of a PWM signal according to an embodiment of the present disclosure.

Referring to FIG. 10, an airbag controller 11 of the method of detecting normality of a PWM signal according to the present disclosure may include a PWM signal generator 12 for generating a preset PWM signal when the vehicle is started.

Referring to FIGS. 2 and 10, the method of detecting normality of a PWM signal according to the present disclosure generates a PWM signal with a particular ratio and a particular period through the PWM signal generator 12 to a vehicle component controller 20 in step S120 from the point in time at which the vehicle is started in step S110. The generated PWM signal is used as a reference value for comparison with an actual value, wherein varied actual values may be measured due to unexpected vibration or shock during the driving of a vehicle. That is, the signal is used as contrast values (first comparison values or second comparison values) for high values and low values among actual values, and will be described below with a specific example.

In the meantime, in the present disclosure, the particular period does not have to be one period, and several periods may be set as one particular unit. Hereinafter, to help the understanding of the disclosure, a detailed description will be given with one period as an example.

In general, a PWM signal has high values and low values that are repeatedly generated with a particular ratio during a particular period with a duty ratio change method. Herein, duty values (logic values according to a high value and a low value) may be values equal to or greater than 0 and equal to or less than 1 when the maximum value of a reference wave is 1. That is, a logic value according to a high value is 1, and a logic value according to a low value is 0.

First, the case in which the generated PWM signal is used as first comparison values will be described. For example, assuming a high value of 60, a low value of 40, and a frequency of 100 Hz, in general, one period of a signal is 10 ms and transmission is performed with a ratio of 6:4. Therefore, in this case, among actual values, the contrast value corresponding to the high value is 6 that is the estimated number of times that the logic value of 1 according to the high value is detected, and the contrast value corresponding to the low value is 4 that is the estimated number of times that the logic value of 0 according to the low value is detected.

Next, the case in which the generated PWM signal is used as second comparison values will be described. Similarly, assuming that a PWM signal is transmitted with a high value:low value ratio of 6:4 during one period, contrast values corresponding to integral values of a high value area and a low value area belonging to a particular period are 6 and 4, wherein 6 is an estimation value for the high values (the contrast value corresponding to the high values) and 4 is an estimation value for the low values (the contrast value corresponding to the low values).

By providing reference values for comparison with measured actual values as described above, an error may be detected that may occur any time in a general driving process during the driving of a vehicle. Further, a DB may be created with information on the failure modes and may accumulate.

That is, unlike a CAN communication 13, in the PWM method having no technique related to a consistency determination method, the prevent disclosure may be used as a consistency determination method.

In the meantime, referring to FIGS. 2 and 10, the airbag controller 11 of the method of detecting normality of a PWM signal according to the present disclosure includes the PWM signal generator 12 for generating a preset PWM signal when the vehicle is started. When a collision occurs to the vehicle in step S130, the PWM signal generator 12 may change the preset PWM signal to generate values different from those before the occurrence of the collision to the vehicle in step S140.

Specifically, when a collision occurs to the vehicle in step S130, the shock detection sensor 14 of the vehicle transmits shock detection information (C/O, crash output) to the airbag controller 11. As soon as the C/O information is received, the PWM signal generator 12 of the airbag controller 11 changes the high values and the low values of the predetermined PWM signal to generate values different from those before the occurrence of the collision in step S140.

Through this process, with respect to the point in time at which a collision occurs to a vehicle, the high values and the low value of the predetermined PWM signal are changed to values different from those before the occurrence of the collision, so that the point in time at which the collision occurs is recognized to distinguish between before and after the occurrence of the collision.

In the meantime, in the present disclosure, the particular period does not have to be one period, and several periods may be set as one particular unit. Hereinafter, to help the understanding of the disclosure, a detailed description will be given with one period as an example.

For example, assuming that a PWM signal is transmitted with a high value:low value ratio of 6:4 during one period, when a collision occurs to the vehicle, the high value:low value ratio of the PWM signal during one period may be inverted into a ratio of 4:6 for transmission.

In this case, the first comparison values respectively corresponding to the high values and the low values are 4 and 6, wherein 4 is the estimated number of the logic values of 1 according to the high value (the contrast value corresponding to the high values) and 6 is the estimated number of the logic values of 0 according to the low value (the contrast value corresponding to the low values).

In addition, the second comparison values respectively corresponding to the high values and the low values are 4 and 6, wherein 4 is an estimation value for the high values (the contrast value corresponding to the high values) and 6 is an estimation value for the low values (the contrast value corresponding to the low values).

In the meantime, inverting the PWM signal as described above is only for helping the understanding of the disclosure, and limitation to inverting an existing PWM signal is not imposed. Various ratios (for example, the high value:low value ratio may be changed from 6:4 to 8:2 or 3:7) capable of distinguishing between the PWM signal before the occurrence of a collision and the PWM signal after the occurrence of a collision may be used.

FIG. 9 is a flowchart showing transmission of detection information to another component controller of a vehicle in a method of detecting normality of a PWM signal according to an embodiment of the present disclosure. FIG. 10 is a structural diagram showing a system 10 including a method of detecting normality of a PWM signal according to an embodiment of the present disclosure.

Referring to FIGS. 9 and 10, after the step of detecting whether the PWM signal is normal, the present disclosure may include transmitting diagnosis results from the airbag controller 11 to the vehicle component controller 20 in step S820.

The three diagnosis results "valid", "invalid", and "error" determined by the airbag controller 11 are stored as detection information and the detection information is transmitted to the vehicle component controller 20 in step S820. The vehicle component controller 20 may use the received diagnosis results as information for a safety analysis. Herein, the detection information may be directly transmitted to the vehicle component controller 20, or may be transmitted through a BUS structure 30 capable of communicating with a plurality of vehicle component controllers 20.

In the meantime, as an example in which diagnosis results are used as information for a safety analysis, a case of being used as information of a method of satisfying the level of the international safety standard requirements (ASIL) in the automobile field will be described.

In general, the ASIL is divided into four levels of categories, and each level may be lowered through the separation of two individual elements that perform the same function, such as "improvement in detection possibility" and "execution of countermeasures".

Accordingly, the method of detecting normality of the PWM signal according to the present disclosure may contribute to "improvement in detection possibility" by detecting an error in the PWM signal and classifying detected information as a failure mode.

Further, comparison is performed on the application results of an alive counter and CRC that are generally applied and perform the same function in the consistency determination by the CAN communication 13, thus satisfying the final ASIL level. For reference, determination of whether the specific ASIL level is satisfied is based on information that the present disclosure provides in the industry field of "execution of countermeasures".

In the meantime, after the step of detecting whether the PWM signal is normal, the present disclosure may include: comparing the diagnosis results with a consistency determination result of the CAN communication 13 to finally determine whether the vehicle satisfies the safety requirements; and transmitting a determination result from the airbag controller 11 to the vehicle component controller 20.

Unlike the embodiment above, the airbag controller 11 may compare the diagnosis results with a consistency determination result of the CAN communication 13 to finally determine whether the vehicle satisfies the safety requirements, and the airbag controller 11 may transmit a determination result to the vehicle component controller 20.

That is, depending on a situation, the airbag controller 11 may use the three diagnosis results "valid", "invalid", and "error" first as information for a safety analysis, and may transmit the result information to the vehicle component controller 20.

According to the method of detecting normality of the PWM signal according to the present disclosure, an error in a pulse-width modulation (PWM) signal is detected using four different self-test logics, and information obtained by categorizing results of detection into failure modes is transmitted to a different component controller of a vehicle, so that the consistency of the PWM signal is determined, a signal safety means is secured, and further, safety standard requirements of the automobile field are satisfied.

Although a particular embodiment of the present disclosure has been described for illustrative purposes, those skilled in the art will appreciate that various modifications, additions, and substitutions are possible, without departing from the technical idea of the disclosure as disclosed in the accompanying claims.

What is claimed is:

1. A method of detecting whether a pulse width modulated (PWM) signal transmitted from an airbag controller to a vehicle component controller is normal, the method comprising:
    counting high values and low values of the PWM signal by detecting a number of high values and a number of low values separately during a particular period of the PWM signal;
    integrating the high values and the low values of the PWM signal;
    comparing count results of the high values and the low values to first comparison values, and comparing integration results of the high values and the low values to second comparison values; and
    detecting whether the PWM signal is normal by separately deriving diagnosis results according to comparisons with the count results and diagnosis results according to comparisons with the integration results.

2. The method of claim 1, wherein the first comparison values are provided in advance as contrast values respectively corresponding to the high values and the low values, and in the comparing step, the count result of the high values and the count result of the low values are compared to the first comparison values.

3. The method of claim 1, wherein the second comparison values are provided in advance as contrast values respectively corresponding to the high values and the low values, and in the comparing step, the integration result of the high values and the integration result of the low values are compared to the second comparison values.

4. The method of claim 1, wherein one of the second comparison values is an integral value of the PWM signal as a whole corresponding to a particular period, and in the comparing step, an integral value of the high values and an integral value of the low values are added, and an addition result is compared to the one of the second comparison values.

5. The method of claim 1, wherein one of the second comparison values is an integral value of the PWM signal as a whole corresponding to a total period, and in the comparing step, an integral value of the high values and an integral value of the low values during the total period are added, and an addition result is compared to the one of the second comparison values.

6. The method of claim 1, wherein in the detecting step, the separately derived diagnosis results are individually counted, and when each count value is equal to or greater than a preset count value, it is determined that a signal transmission system has failed.

7. The method of claim 1, wherein an in-vehicle warning light is turned on depending on a result of the detecting step.

8. The method of claim 1, wherein the airbag controller is provided with a PWM signal generator configured to generate a preset PWM signal when a vehicle is started.

9. The method of claim 1, wherein the airbag controller is provided with a PWM signal generator configured to generate a preset PWM signal when a vehicle is started, and
when a collision occurs, the PWM signal generator is configured to change the preset PWM signal to generate values different from those before the occurrence of the collision.

10. The method of claim 1, further comprising:
transmitting the diagnosis results from the airbag controller to the vehicle component controller after the step of detecting whether the PWM signal is normal.

11. The method of claim 1, further comprising:
comparing the diagnosis results to a consistency determination result of communication for the vehicle after the step of detecting whether the PWM signal is normal, and finally determining whether safety requirements of the vehicle are satisfied; and
transmitting a determination result from the airbag controller to the vehicle component controller.

12. A method of detecting whether a pulse width modulated (PWM) signal transmitted from an airbag controller to a vehicle component controller is normal, the method comprising:
counting high values and low values of the PWM signal;
integrating the high values and the low values of the PWM signal by integrating a high value area and a low value area separately within a particular period of the PWM signal
comparing count results of the high values and the low values to first comparison values, and comparing integration results of the high values and the low values to second comparison values; and
detecting whether the PWM signal is normal by separately deriving diagnosis results according to comparisons with the count results and diagnosis results according to comparisons with the integration results.

13. A method of detecting whether a pulse width modulated (PWM) signal transmitted from an airbag controller to a vehicle component controller is normal, the method comprising:
counting high values and low values of the PWM signal;
integrating the high values and the low values of the PWM signal by integrating a high value area and a low value area separately within a total period of the PWM signal, and the total period of the PWM signal being predetermined and is as a sum of particular periods of the PWM signal
comparing count results of the high values and the low values to first comparison values, and comparing integration results of the high values and the low values to second comparison values; and
detecting whether the PWM signal is normal by separately deriving diagnosis results according to comparisons with the count results and diagnosis results according to comparisons with the integration results.

* * * * *